UNITED STATES PATENT OFFICE.

LYDE STUART PRATT AND EARL H. WELTZ, OF PENNS GROVE, NEW JERSEY, AND WILLIAM LESTER MILLS, OF CHESTER, PENNSYLVANIA, ASSIGNORS TO E. I. DU PONT DE NEMOURS & COMPANY, OF WILMINGTON, DELAWARE, A CORPORATION OF DELAWARE.

PROCESS OF MAKING ALKYL-NITROARYL ETHERS.

No Drawing. Application filed October 18, 1920, Serial No. 417,838. Renewed July 24, 1926.

This invention relates to the production of alkyloxyl derivatives of nitro-aromatic compounds; and it comprises, as a new process, the condensation of an alkyloxy compound, such as an alcohol or an alkali-metal alcoholate, with a nitro-aryl compound, such as a mono- or poly-nitro-aryl halide, in the presence of a substance, under pressure, such, for example, as an oxidizing agent, capable of hindering or preventing concurrent reduction and decomposition of the nitro compound.

In the preparation of certain compounds, such as orthonitranisole, para-nitranisole, para-nitro-phenetole, etc., from nitro-chlorobenzene, sodium hydroxide, and alcohol, the main reaction is accompanied, under certain conditions, by side reactions such as reduction, which result in the formation of what are probably azo or azoxy compounds and decomposition products. These not only diminish the yield of the desired product, but also make necessary a purification or separation of the desired product from the impurities.

We have discovered that a remarkable saving in time may be effected by conducting the condensation under a comparatively high temperature, and that undesirable side reactions are almost entirely avoided, with a consequent increase in yield and purity of product, if there is present during the reaction an oxidizing agent, preferably in comparatively high concentration, as, for example, gaseous oxygen under pressure, which may advantageously be from 75 to 175 pounds per square inch.

Our process may be illustrated by the following examples:—

1. Preparation of para-nitrophenetole.

3-6 parts of 90-100% ethyl alcohol are heated in an autoclave with .3 parts of 100% caustic until solution is effected. The mass is cooled down and one part of para-nitrochlorobenzene is added. Oxygen is then introduced into a free board space of 25-50% of the autoclave capacity, from a high pressure cylinder until a pressure of 100-150 lbs. is reached. The temperature is then raised in 3-5 hours to 100° C. and maintained one hour. During the course of the reaction, the pressure is maintained at about 150 lbs. by passing in more oxygen. The charge is then cooled down to 30-40°, the pressure is released and an additional .096 parts of fine dry 100% caustic soda are added. Oxygen is then led in until the above pressure conditions are re-established, the charge is again heated to 100° in 2-3 hours, and held for one hour, the temperature is again lowered and a second additional charge of .096 parts of caustic soda is charged in, oxygen is recharged into the autoclave and the mass is again heated to 100° C. in a similar manner. This time the temperature is held at 100° C. until the maximum condensation, as indicated by control tests, has taken place. Maximum condensation takes place in 2-8 hours. When the reaction is complete, the product may be obtained after distilling off the alcohol, or it may be isolated by crystallizing from the mother liquor solution. A yield of 85-95% of the theoretical amount of para-nitrophenetole is obtained. In the above example there may ordinarily be used any quantity of caustic soda between .35 and .50 parts for each four parts of ethyl alcohol, although we prefer to use a total of .492 parts in the manner described above.

2. Preparation of ortho-nitroanisole.

0.28 to 0.30 parts 100% caustic soda are dissolved in 3-5 parts of 95-99% methyl alcohol and after the addition of one part of ortho-nitro-chlor-benzene, air or oxygen or a mixture of the two is blown or pumped into the autoclave until the pressure registers 40 pounds pressure. The mass is then heated to 105°-110° C. with a pressure of 80-85 pounds. The heating is continued at this temperature for 4-12 hours, or until the reaction is complete. The determination is made by control test. The excess alcohol is distilled off and the nitro-anisole is then drawn off, after washing with hot water to dissolve the sodium chloride and nitro-phenolates which are also formed in the reaction.

The yield of ortho-nitro-anisole will average 95-98% of theory. The product may be satisfactorily used without purification for the manufacture of dianisidine, or anisidine.

Instead of caustic soda other alkalies may be used to promote the condensation of the alcohol and nitro-aryl halide.

Great advantages are possessed by our new process over known processes. By carrying out the reaction at a comparatively high temperature, and in comparatively high concentration, in the presence of an oxidizing agent under pressure, it is possible to obtain a high yield of product, which is practically free in most cases from side reaction products, in a short period of time. Our process not only gives a comparatively pure product but makes possible a high production through an increase in the capacity of the plant. This increased capacity is due not only to the shorter time required for a single run, but also the small quantity of alcohol needed.

Although a gaseous oxidizing agent such as air or oxygen is preferred, especially when the reaction is carried out under high pressure, our invention also includes the use of liquid or solid oxidizing agents, as for example metal oxides such as manganese peroxide, sodium peroxide, or cupric oxide; solutions such as that of hydrogen peroxide; potassium ferricyanide, etc.

As examples of nitroaryl ethers other than o-nitranisole and p-nitrophenetole which may be made by the new process, there may be mentioned dinitroanisole and p-nitroanisole, using as starting materials dinitro-chlorobenzene and p-nitrochlorobenzene, respectively, on the one hand, and a methyl alcohol solution of an alkali-metal hydroxide on the other.

The inner surface of the autoclave in which condensation is effected may be iron or may be enameled or glazed. With a metallic surface there is an increased tendency toward reduction, but this is counteracted by the oxidizing agent.

We have described in detail the temperatures, pressures, and other conditions of operation which may be used to advantage, but it will be understood that these conditions may be varied considerably without departing from our invention. Thus, although in the cases of nitroanisole and nitrophenetole a temperature between 95 and 115° C. is preferred, a temperature either above or below this range may be used.

We claim:—

1. A process of making alkyloxyl derivatives of nitro aromatic compounds which comprises heating a mixture containing an alcohol, a caustic alkali, and a nitroaryl halide in the presence of an oxidizing agent capable of hindering the reduction of the nitro group.

2. A process of making alkyloxyl derivatives of nitro aromatic compounds which comprises heating a mixture containing an alcohol, an alkali-metal hydroxide, and a nitroaryl chloride under a pressure substantially above atmospheric pressure in the presence of an oxidizing agent.

3. A process of making alkyloxyl derivatives of nitro aromatic compounds which comprises heating a mixture containing an alcohol, an alkali-metal hydroxide, and a nitrochlorobenzene in the presence of an oxidizing agent capable of hindering the reduction of the nitro group.

4. A process of making a nitrophenyl ether which comprises heating an alcohol solution of an alkali-metal hydroxide with a nitrochlorobenzene in the presence of gaseous oxygen under pressure.

5. A process of making a nitrophenyl ether which comprises heating at a temperature between 95 and 115° C. a methyl alcohol solution of an alkali-metal hydroxide with a nitrochlorobenzene in the presence of gaseous oxygen under pressure.

6. A process of making a nitrophenyl ether which comprises heating at a temperature between 95 and 115° C. an alcohol solution of sodium hydroxide with a nitrochlorobenzene in the presence of gaseous oxygen under a total pressure between 75 and 175 pounds.

7. A process of making a nitro-anisole which comprises heating a mixture containing from about 3 to 5 parts of methyl alcohol having a strength of from 95 to 99%, about three tenths of a part of sodium hydroxide, and one part of a nitrochlorobenzene, to a temperature of from about 105 to 110° C. in the presence of gaseous oxygen under pressure.

8. A process of making a nitrophenyl ether which comprises effecting condensation between an alcohol and a nitrochlorobenzene under pressure in the presence of an oxidizing agent and of a substance capable of promoting the condensation of the alcohol with said nitrochlorobenzene.

9. A process of producing a nitrophenyl ether which comprises effecting condensation between an alcohol and a nitrochlorobenzene in the presence of a substance capable of promoting said condensation and of an oxidizing agent present in a state of comparatively high concentration.

10. A process of making alkyloxyl derivatives of nitro aromatic compounds which comprises heating a mixture containing an alcohol, a caustic alkali, and a nitroaryl halide in the presence of an oxidizing agent present in a state of comparatively high concentration.

11. A process of making alkyloxyl derivatives of nitro aromatic compounds which comprises heating a mixture containing an alcohol, an alkali-metal hydroxide, and a nitrochlorobenzene at a temperature between 95 and 115° C. in the presence of an oxidizing agent present in a state of comparatively high concentration.

In testimony whereof we affix our signatures.

LYDE STUART PRATT.
EARL H. WELTZ.
WILLIAM LESTER MILLS.